US 12,151,338 B2

(12) United States Patent
Wei et al.

(10) Patent No.: US 12,151,338 B2
(45) Date of Patent: Nov. 26, 2024

(54) DUST COLLECTION DEVICE AND POWER TOOL

(71) Applicant: Nanjing Chervon Industry Co., Ltd., Nanjing (CN)

(72) Inventors: Wei Wei, Nanjing (CN); Qipeng Zhu, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 1396 days.

(21) Appl. No.: 16/527,818

(22) Filed: Jul. 31, 2019

(65) Prior Publication Data

US 2019/0351528 A1   Nov. 21, 2019

Related U.S. Application Data

(63) Continuation of application No. PCT/CN2018/081040, filed on Mar. 29, 2018.

(30) Foreign Application Priority Data

Apr. 1, 2017   (CN) .......................... 201710217774.3
Oct. 20, 2017   (CN) .......................... 201710983764.0
(Continued)

(51) Int. Cl.
*B24B 55/10*   (2006.01)
*B24B 23/00*   (2006.01)
*B24B 23/02*   (2006.01)

(52) U.S. Cl.
CPC .......... *B24B 55/102* (2013.01); *B24B 23/005* (2013.01); *B24B 23/028* (2013.01)

(58) Field of Classification Search
CPC ............ B23Q 11/0046; B23Q 11/0071; B24B 23/005; B24B 23/028; B24B 55/102
(Continued)

(56) References Cited

U.S. PATENT DOCUMENTS

2012/0080206 A1*   4/2012   Walker .................... B24B 55/10
173/198

FOREIGN PATENT DOCUMENTS

CN              1775485 A        5/2006
CN           101913110 A       12/2010
(Continued)

OTHER PUBLICATIONS

ISA/CN, International Search Report issued on PCT application No. CN2018/081040, dated May 30, 2018, 2 pages.

*Primary Examiner* — Tom Rodgers
(74) *Attorney, Agent, or Firm* — Greenberg Traurig, LLP

(57) ABSTRACT

A dust collection device for use with a power tool includes a housing, an air inlet pipe, a cyclone pipe, an air duct pipe, and a ventilation pipe. The air inlet pipe is configured to guide an airflow to enter the dust collection device along a first straight line. The cyclone pipe extends along the second straight line. The cyclone pipe has a first end for air intake and a second end for dust discharge. The ventilation pipe is arranged at the first end and communicated with the cyclone pipe and is configured to guide the airflow after the airflow is subjected to dust separation performed by the cyclone pipe out of the housing. The second straight line along which the cyclone pipe extends intersects the first straight line to form an angle greater than or equal to 25° and less than or equal to 90°.

19 Claims, 12 Drawing Sheets

(30) Foreign Application Priority Data

Oct. 20, 2017 (CN) .......................... 201710984266.8
Oct. 20, 2017 (CN) .......................... 201721371202.2

(58) Field of Classification Search
USPC ........................................................ 451/359
See application file for complete search history.

(56) References Cited

FOREIGN PATENT DOCUMENTS

| | | |
|---|---|---|
| CN | 101096095 B | 12/2011 |
| CN | 204166218 U | 2/2015 |
| CN | 104511888 A | 4/2015 |
| CN | 204843868 U | 12/2015 |
| CN | 207344515 U | 5/2018 |
| CN | 105642947 B | 7/2018 |
| GB | 2340056 B | 7/2000 |
| JP | 2007061977 A | 3/2007 |

* cited by examiner

DUST COLLECTION DEVICE AND POWER TOOL

RELATED APPLICATION INFORMATION

The present application is a continuation of International Application Number PCT/CN2018/081040, filed on Mar. 29, 2018, through which this application also claims the benefit of Chinese patent application No. CN 201710217774.3, filed on Apr. 1, 2017, Chinese patent application No. CN 201710984266.8, filed on Oct. 20, 2017, Chinese patent application No. CN 201721371202.2, filed on Oct. 20, 2017, and Chinese patent application No. CN 201710983764.0, filed on Oct. 20, 2017, the disclosure of which are incorporated herein by reference in their entirety.

TECHNICAL FIELD

The present disclosure relates to a power tool, and in particular, relates to a dust collection device.

BACKGROUND

Existing power tools such as a sander, an abrasive belt machine, an angle grinder, and an electric circular saw may generate a large amount of debris, so these power tools need to be equipped with a dust collection device for dust removal.

For a conventional gauze structure used for dust collection, fine dust may pass through the mesh of the gauze structure, which consequently leads to an unsatisfactory collection effect, and cannot effectively prevent the dust from entering the air.

SUMMARY

In one aspect of the disclosure, a dust collection device includes a housing, defining an accommodating chamber for collecting a dust, an air inlet pipe, configured to guide an airflow to enter the dust collection device along a first straight line, a cyclone pipe, extending along a second straight line and comprising a first end for the air intake and a second end for the dust discharge along the second straight line, an air duct pipe, defining an air duct communicating the air inlet pipe with the cyclone pipe, and a ventilation pipe, arranged at the first end of the cyclone pipe and communicated with the cyclone pipe. The ventilation pipe is configured to guide the airflow after being subjected to dust separation performed by the cyclone pipe out of the housing. The housing further defines an air outlet that is communicated with the ventilation pipe or through which the ventilation pipe extends out of the housing. The second straight line along which the cyclone pipe extends intersects the first straight line to form an angle greater than or equal to 25° and less than or equal to 90°.

The second straight line direction along which the cyclone pipe extends and the first straight line may be perpendicular to each other.

The dust collection device may further include an air guiding portion configured to guide the airflow from the air duct to enter the cyclone pipe substantially along a direction perpendicular to the second straight line.

The housing may include a first housing portion, defining the air outlet, and a second housing portion, detachably connected to the first housing portion, wherein the accommodating chamber is formed on condition that the second housing portion is joined with the first housing portion.

The air inlet pipe, the cyclone pipe, the air duct pipe and the ventilation pipe may be fixedly connected to the second housing portion.

The air duct pipe may at least partially extend along a direction that obliquely intersects the second straight line.

The air duct pipe may include a third end connected to the air inlet pipe and a fourth end connected to the cyclone pipe, the third end and the fourth end being located at two ends along an extending direction of the air duct pipe. Along the second straight line, the fourth end and the third end of the air duct pipe constitute a height difference.

The housing may have a length extending along the first straight line. The second straight line along which the cyclone pipe extends in the accommodating chamber would be perpendicular to the length of the housing.

The cyclone pipe may further include an intermediate section arranged between the first end and the second end along the second straight line. The intermediate section has an inner wall which has a circular cross section in a plane perpendicular to the second straight line. A ratio of a diameter of the circular shape formed by the cross section of the inner wall of the intermediate section in the plane perpendicular to the second straight line to a length of cyclone pipe along the second straight line is greater than or equal to 0.4 and less than or equal to 0.7.

The diameter of the inner wall of the intermediate section may be greater than or equal to 30 mm and less than or equal to 60 mm.

The air inlet pipe may be a cylinder-shaped pipe where the diameter of the inner wall of the intermediate section is greater than a diameter of an inner wall of the air inlet pipe.

A number of the cyclone pipes may be 1.

The first straight line along which the airflow enters the air inlet pipe and the second straight line along which the cyclone pipe extends may be perpendicular to each other.

The air inlet pipe may be located between the first end and the second end along a direction parallel to the second straight line.

The housing may include a first housing portion, defining an air outlet communicated with the ventilation pipe or through which the ventilation pipe extends out of the housing, and a second housing portion, disposed to be detachably connected to the first housing portion, wherein the accommodating chamber is formed by the second housing portion and the first housing portion on condition that the second housing portion is joined with the first housing portion. The accommodating chamber is opened to form a dust pouring opening for pouring out the dust in the accommodating chamber on condition that the second housing portion and the first housing portion are detached from each other.

The air inlet pipe, the cyclone pipe, the air duct pipe and the ventilation pipe may be fixedly connected to the second housing portion, so that the air inlet pipe, the cyclone pipe, the air duct pipe and the ventilation pipe are separated from the accommodating chamber on condition that the second housing portion is detached from the first housing portion.

The dust pouring opening may be opened toward a direction in which the second housing portion is detached from the first housing portion.

The first housing portion may be provided with a guiding rail for guiding the second housing portion to be joined to the first housing portion along the first straight line. The second housing portion is provided with a matching portion for cooperating with the guiding rail.

The housing may have a length extending along the first straight line. The housing comprises a front wall and a rear wall at two ends in the length of the housing. The rear wall is formed by the first housing portion, and the front wall is formed by the second housing portion.

An outer side of the first housing portion may be provided with an elastic tab having a hook portion. The second housing portion is provided with a slot into which the hook portion is partially embedded. The elastic tab is configured to generate an elastic force that is operative to move the hook portion toward the slot to be embedded into the slot.

The air inlet pipe may be configured to communicate an inside and an outside of the housing. The air inlet pipe is fixedly connected to the second housing portion and penetrates through the second housing portion in the first straight line.

The second straight line along which the cyclone pipe extends and the first straight line may be perpendicular to each other. The housing has a length extending along the first straight line and a width direction extending along the second straight line. A size of the housing in the length is greater than a size of the housing in the width direction.

A projection of the air inlet pipe onto a plane perpendicular to the first straight line may be located within a projection of the dust pouring opening onto the plane perpendicular to the first straight line.

In another aspect of the disclosure, a power tool includes a tool housing, a motor arranged inside the tool housing, and the dust collecting device described above.

Further, the housing may include a dust heaping plane for heaping the dust. On condition that the dust collection device is mounted onto the tool housing and the power tool is arranged on a working plane parallel to a horizontal plane, the dust heaping plane obliquely intersects the horizontal plane.

The present disclosure offers advantages of a high dust collection efficiency with the dust collection device, and more efficient dust separation.

DETAILED DESCRIPTION

Figure 1:
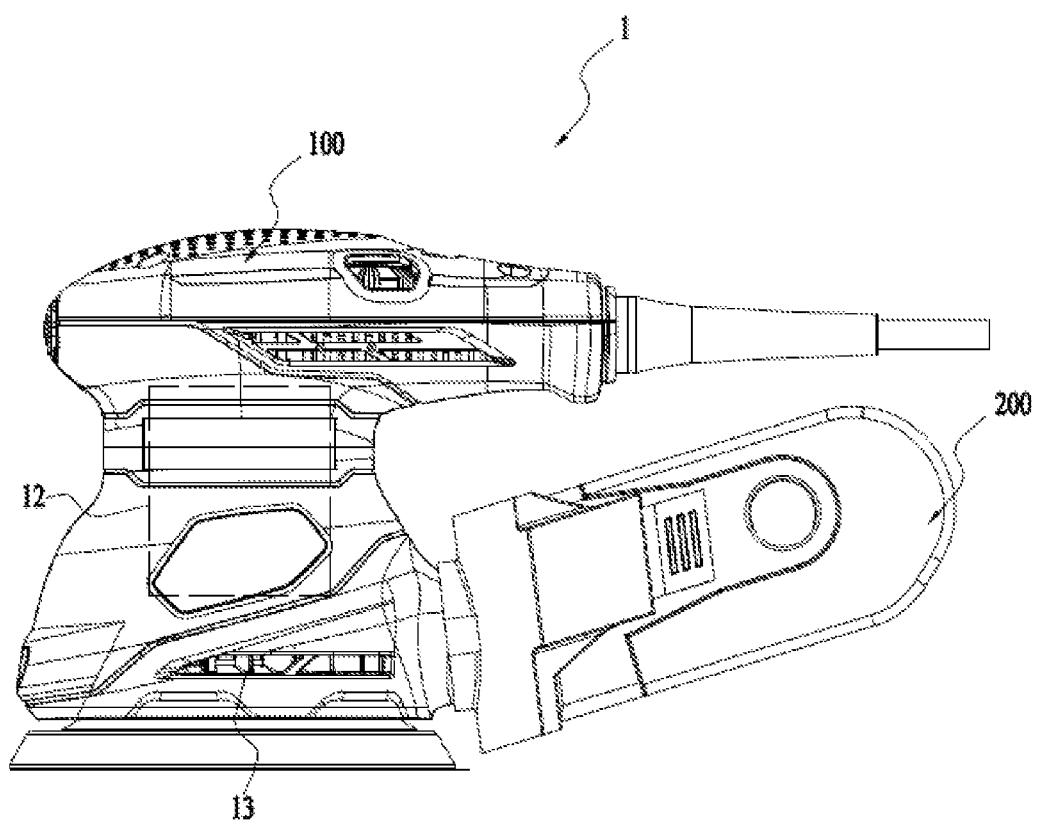
FIG. 1 is a plan view of an example power tool.
Figure 2:
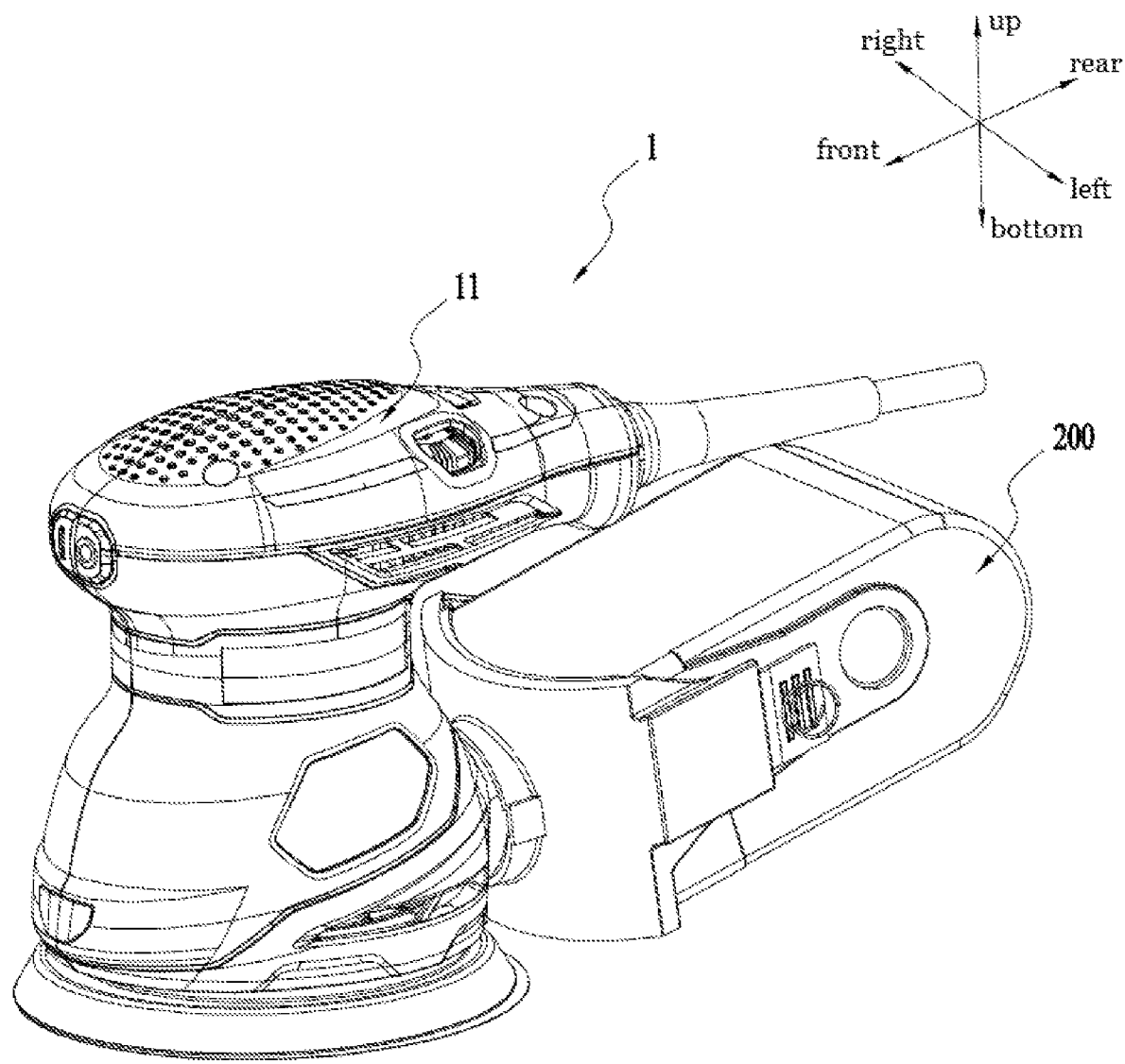
FIG. 2 is a perspective view of the power tool of FIG. 1.
Figure 3:
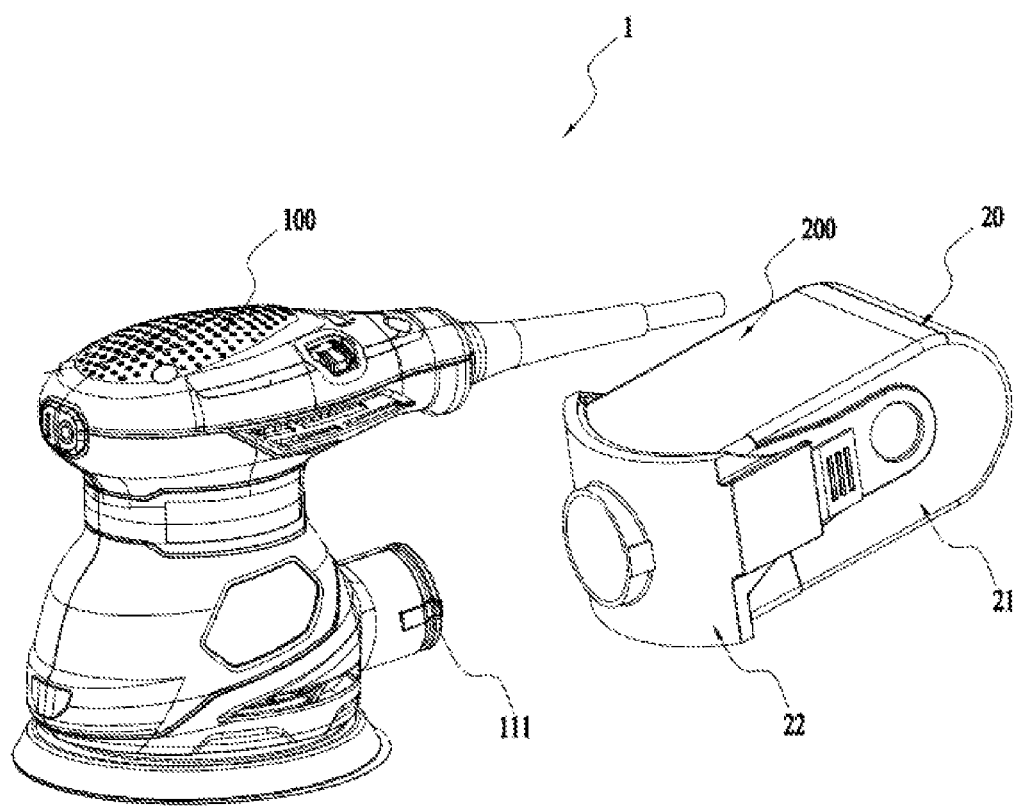
FIG. 3 is a perspective view of the power tool of FIG. 1 when a tool main body is separated from a dust collection device.
Figure 4:
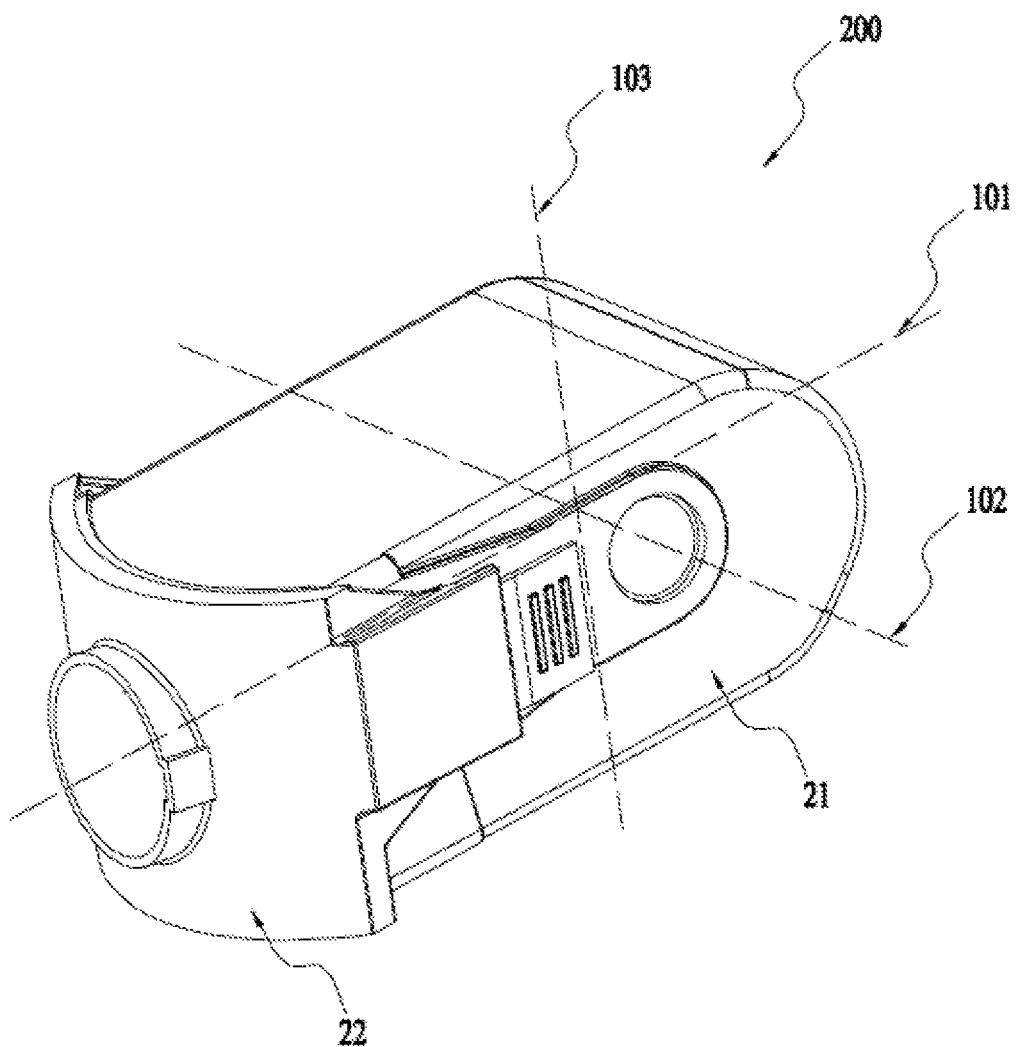
FIG. 4 is a perspective view of the dust collection device of FIG. 1.

A power tool 1 according to the first example as illustrated in FIG. 1 to FIG. 3 includes a tool main body 100 and a dust collection device 200. The tool main body 100 may be a grinding-type tool which may generate a large amount of dust, thus the dust collection device 200 for collecting the dust is necessary to be arranged on this kind of tools. The tool main body 100 may include a tool housing 11, a motor 12, and a fan 13. The tool housing 11 may be provided with an outlet 111 through which the dust is discharged out of the tool main body 100. The dust collection device 200 is connected to the outlet 111. The motor 12 and the fan 13 are arranged inside the tool housing 11. When the motor 12 operates, the fan 13 can generate an airflow and the dust can be discharged to the dust collection device 200 along with the airflow; or the dust collection device 200 may be connected to an external vacuum cleaner, and the dust is extracted into the dust collection device 200 through the vacuum cleaner; or the dust collection device may be self-contained with a dust extraction fan, and the dust is extracted into the dust collection device 200 through the dust extraction fan.

As illustrated in FIG. 3, the tool main body 100 and the dust collection device 200 are detachably connected, so that the user can selectively determine whether the dust collection device 200 needs to be mounted to the tool main body 100 to perform the dust extraction treatment.

As illustrated in FIG. 3 to FIG. 9, the dust collection device 200 includes a housing 20 provided with an accommodating chamber 201 for collecting dust. The housing 20 includes a first housing portion 21 and a second housing portion 22. The first housing portion 21 and the second housing portion 22 are detachably connected. When the second housing portion 22 is joined to the first housing portion 21, the accommodating chamber 201 is formed between the first housing portion 21 and the second housing portion 22. When the second housing portion 22 is detached from the first housing portion 21, the accommodating chamber 201 is opened to form a dust pouring opening 212 through which the dust is poured out of the accommodating chamber 201. In this way, when cleaning the dust in the accommodating chamber 201, the user only needs to detach the second housing portion 21 from the first housing portion 21; namely, the dust can be poured out through the opened dust pouring opening 212, so that the dust in the accommodating chamber 201 can be cleaned more thoroughly. The dust pouring opening 212 may be defined to be relatively large, which is favorable for pouring out the dust. In addition, by defining a dust pouring opening 212 be means of the detachable connection between the first housing portion 21 and the second housing portion 22, the housing 20 of the dust collection device does not need to be separately provided with an opening for pouring the dust and a door for closing the opening, so that the dust collection device 200 is simple in structure and can be easy to manufacture. It should be noted that the detachable connection in the present disclosure means that the first housing portion 21 and the second housing portion 22 can be quickly detached and mounted by the user without needing an auxiliary tool.

The first housing portion 21 has a length extending along a first straight line 101, a width extending along a second straight line 102, and a height extending along a third straight line 103. It should be understood that a dimension of the first housing portion 21 in the length direction should be larger than a dimension of the first housing portion 21 in the width direction, and also larger than a dimension of the first housing portion 21 in the height direction.

To facilitate description of the technical solution according to the present disclosure, terms "front", "rear", "left", "right", "up", and "down" are also defined as illustrated in FIG. 2.

The first housing portion 21 extending along the first straight line 101 in the length direction includes a rear wall 211 facing away from the tool main body 100. A front end of the first housing portion 21 opposite to the rear wall 211 is opened forwards to form the dust pouring opening 212, thereby coupling the second housing portion 22. The first housing portion 21 extending along the second straight line 102 in the width direction includes a left wall 213 and a right wall 214. The first housing portion 21 extending along the third straight line 103 in the height direction includes an upper wall 215 and a lower wall 216. The opened accommodating chamber 201 with the dust pouring opening 212 is formed between the rear wall 211, the left wall 213, the right wall 214, the upper wall 215, and the lower wall 216. The second housing portion 22 includes a front wall 225 at least partially covering the dust pouring opening 212. The dust pouring opening 212 is opened towards the direction in which the second housing portion 22 is detached from the first housing portion 21.

The second housing portion 22 may be inserted into the first housing portion 21 or be pulled out of the first housing portion 21 through the dust pouring opening 212 of the first housing portion 21 along the first straight line 101, i.e., the second housing portion 22 and the first housing portion 21 are detachably connected along the first straight line 101. In this way, when the dust in the accommodating chamber 201 needs to be poured out, the user may pull out the second housing portion 22 from the first housing portion 21 along the first straight line 101, and then pour out the dust through the dust pouring opening 212 of the first housing portion 21 that is opened forward. An area of a projection of the dust pouring opening 212 onto a plane perpendicular to the first straight line 101 is greater than an area of a projection of the outlet onto the plane perpendicular to the first straight line 101, so that the dust pouring opening 212 is relatively large, which is favorable for pouring out the dust.

In one example, the dust collection device 200 further includes an air inlet pipe 221, a cyclone pipe 222, an air duct pipe 223, and a ventilation pipe 224. The air inlet pipe 221 is configured to guide the airflow to enter the dust collection device 200 along the first straight line 101. The cyclone pipe 222 is configured to generate a cyclone to separate the dust from the airflow. The air duct pipe 223 is configured to connect the air inlet pipe 221 to the cyclone pipe 222. The ventilation pipe 224 is configured to communicate an inside and an outside of the cyclone pipe 222 to guide the airflow after being subjected to dust separation by the cyclone pipe 222 out of the cyclone pipe 222. When the second housing portion 22 and the first housing portion 21 are coupled to form the accommodating chamber 201, the cyclone pipe 222 and the air duct pipe 223 are arranged inside the accommodating chamber 201, the air inlet pipe 221 is at least partially arranged inside the accommodating chamber 201, and the ventilation pipe 224 is also at least partially arranged inside the accommodating chamber 201. The air inlet pipe 221, the cyclone pipe 222, the air duct pipe 223, and the ventilation pipe 224 are further fixedly connected to the second housing portion 22. In this way, when the second housing portion 22 is detached from the first housing portion 21 by the user to pour out the dust, the air inlet pipe 221, the cyclone pipe 222, the air duct pipe 223 and the ventilation pipe 224 along with the second housing portion 22 are separated from the first housing portion 21 and, accordingly, are separated from the accommodating chamber 201, so that no other component stopping the dust in the space surrounded and formed by the first housing portion 21 is provided, and the dust can be more freely poured out through the dust pouring opening 212.

In one example, the air inlet pipe 221 is further configured to connect the dust collection device 200 to the outlet 111 of the tool main body 100. The air inlet pipe 221 substantially extends along the first straight line 101 and penetrates through the second housing portion 22 in the first straight line 101, so that an inside and an outside of the housing 20 are communicated by the air inlet pipe 221. Namely, the first straight line 101 along which the air inlet pipe 221 extends coincides with the length of the housing 20. A projection of the air inlet pipe 221 onto the plane perpendicular to the first straight line 101 is located within a projection of the dust pouring opening 212 onto the plane perpendicular to the first straight line 101.

In the present example, the dust collection device 200 only includes one cyclone pipe 222. The cyclone pipe 222 substantially extends along the second straight line 102. The second straight line 102 along which the cyclone pipe 222 extends intersects the first straight line 101 direction along which the airflow enters the air inlet pipe 221 to form an angle, and the angle is greater than or equal to 25° and less than or equal to 90° (the term "intersect" includes the case in which the second straight line 102 intersects the first straight line 101 in a same plane, and further includes the case in which the second straight line 102 intersects other straight lines parallel to the first straight line 101). In this way, the airflow entering from the air inlet pipe 221 can enter the cyclone pipe 222 without changing the flow direction by a large angle, so that the loss of the airflow is reduced and the effect of dust extraction is improved.

In the present example, the second straight line 102 along which the cyclone pipe 222 extends is perpendicular to the first straight line 101 along which the airflow enters the air inlet pipe 221. In one example, the second straight line 102 direction in which the cyclone pipe 222 extends coincides with the width of the housing 20. It should be understood that in other examples a direction along which the cyclone pipe 222 extends may be different from the width of the housing 20. The cyclone pipe 222 is provided with a first end 222a for air intake and a second end 222b for dust discharge in the second straight line 102. In another example, the first end 222a is more adjacent to the left wall 213, and the second end 222b is more adjacent to the right wall 214. The air duct pipe 223 is configured to form an air duct 223a for communicating the air inlet pipe 221 with the cyclone pipe 222. The ventilation pipe 224 is arranged at the first end 222a of the cyclone pipe 222 and communicated with the cyclone pipe 222. In order to enable the airflow to flow out of the dust collection device 200, the first housing portion 21 is further formed with an air outlet 213a. The air outlet 213a corresponds to a position of the ventilation pipe 224 and is communicated with the ventilation pipe 224. It should be understood that in other examples the ventilation pipe 224 may also directly protrude out of the housing 20. The ventilation pipe 224 and the first end 222a are more adjacent to the left wall 213 in the second straight line 102, and the air outlet 213a also needs to be more adjacent to the first end 222a. Therefore, the air outlet 213a is arranged on the left wall 213 more adjacent to the first end 222a, and penetrates through the left wall 213 in the second straight line 102. The front wall 225 is configured to close the dust pouring opening 212 of the first housing portion 21 when opened forward on condition that the second housing portion 22 is coupled to the first housing portion 21. The air inlet pipe 221 is arranged on the front wall 225. Correspondingly, the rear wall 211 is farther from the air inlet pipe 221 than the front wall 225, so that the dust collection device 200 is reasonable in structure, convenient in disassembly and assembly, suitable in size and good in dust collecting effect.

When the power tool 1 performs the grinding operation, the airflow with the dust firstly enters the dust collection device 200 through the air inlet pipe 221, and then enters the cyclone pipe 222 through the air duct pipe 223. At this moment, the dust is guided to the accommodating chamber 201 through the second end 222b under the action of the cyclone pipe 222, so that the airflow without the dust flows out from the ventilation pipe 224 and the air outlet 213a in sequence.

The cyclone pipe 222 further includes an intermediate section 222c arranged between the first end 222a and the second end 222c. The intermediate section 222c has a hollow cylinder shape. The intermediate section 222c is provided with an inner wall 222d of which a cross section in a plane perpendicular to the second straight line 102 is a circular shape. A ratio of a diameter of the circular inner wall 222d of the intermediate section 222c to a length L of the cyclone pipe 222 along the second straight line 102 is greater than or equal to 0.4, and less than or equal to 0.7. In this way, when the length of the cyclone pipe 222 is constant, an area of the cross section of the inner wall 222d of the cyclone pipe 222 will not be too small to result in that the inner wall 222d of the cyclone pipe 222 generates a relatively large resistance to the airflow, thereby avoiding the problem that the efficiency of the dust extraction is reduced due to the decrease of flow rate of the airflow. In addition, when the length of the cyclone pipe 222 is constant, the area of the cross section of the inner wall 222d of the cyclone pipe 222 will not be too large to result in that the centrifugal force of the dust is insufficient, thereby avoiding the problem that the dust separation is not thorough due to the low centrifugal force. In another example, the diameter of the circular inner wall 222d of the intermediate section 222c of the cyclone pipe 222 is greater than or equal to 30 mm, and less than or equal to 60 mm.

In another example, along a direction parallel to the second straight line 102, the air inlet pipe 221 is located between the first end 222a and the second end 222b. In another example, in the second straight line 102, the air inlet pipe 221 is substantially arranged at a center of front wall 225; namely, in the second straight line 102, the air inlet pipe 221 is substantially arranged at a center of the first housing portion 21; and in the third straight line 103, the air inlet pipe 221 is substantially arranged at the center of the front wall 225. It should be noted that it is known that, in general, the dust collection device 200 is not necessarily a completely symmetrical structure. Therefore, the center refers to a portion which is substantially located at the center, and is not limited to a center in a strict sense. The air inlet pipe 221 is a cylindrical pipe having a central axis in the first straight line 101. The diameter of the circular inner wall 222d of the intermediate section 222c is larger than a diameter of an inner wall of the air inlet pipe 221.

The air duct pipe 223 includes a third end 223b for connecting the air inlet pipe 221 and a fourth end 223c for connecting the cyclone pipe 222, where the third end 223b and the fourth end 223c are located at two ends of the air duct pipe 223 in a direction along which the air duct pipe 223 extends. The air duct pipe 223 further includes an oblique portion 223d which at least partially extends along a fourth straight line 104 obliquely intersecting the second straight line 102. The fourth straight line 104 along which the oblique portion 223b extends obliquely intersects the first straight line 101. In this way, in the second straight line 102, a height difference H is present between the fourth end 223c and the third end 223b, such that the first end 222a of the cyclone pipe 222 is arranged to be as adjacent as possible to the left wall 213, thus the size of the dust collection device 200 in the width may be reduced as much as possible on condition that a size of the cyclone pipe 222 is constant, which facilitates the miniaturization of the dust collection device 200. It should be noted that the height difference refers to the height difference between the fourth end 223c and the third end 223b along the second straight line 102, and is not limited to the difference in the height direction.

Figure 9:
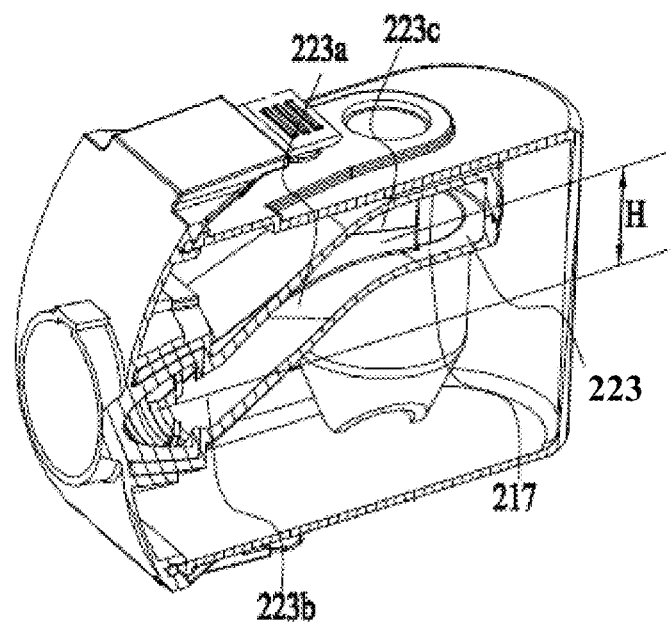
FIG. 9 is a perspective view of the dust collection device of FIG. 4 when a housing is cross sectioned.

As illustrated in FIG. 9, the dust collection device 200 further includes an air guiding portion 217. The air guiding portion 217 is an air guiding surface extending perpendicular to the first straight line 101. The air guiding surface is connected to the air duct pipe 223 and the cyclone pipe 222. The air guiding surface may at least partially be arranged at the inner wall 222d of the cyclone pipe 222. In this way, the air guiding portion 217 is operative to guide the airflow from the air duct 223a to enter the cyclone pipe 222 substantially along the direction perpendicular to the second straight line 102, so that the obstruction of the airflow by the cyclone pipe 222 is reduced, thus the loss of the airflow is reduced and the effect of dust separation is improved.

Figure 5:
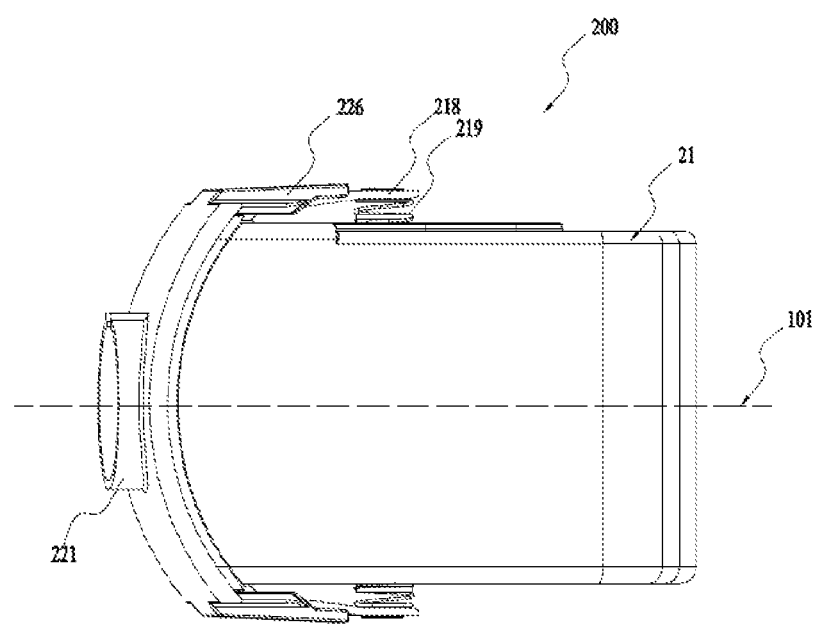
FIG. 5 is a top view of the dust collection device of FIG. 4.
Figure 6:
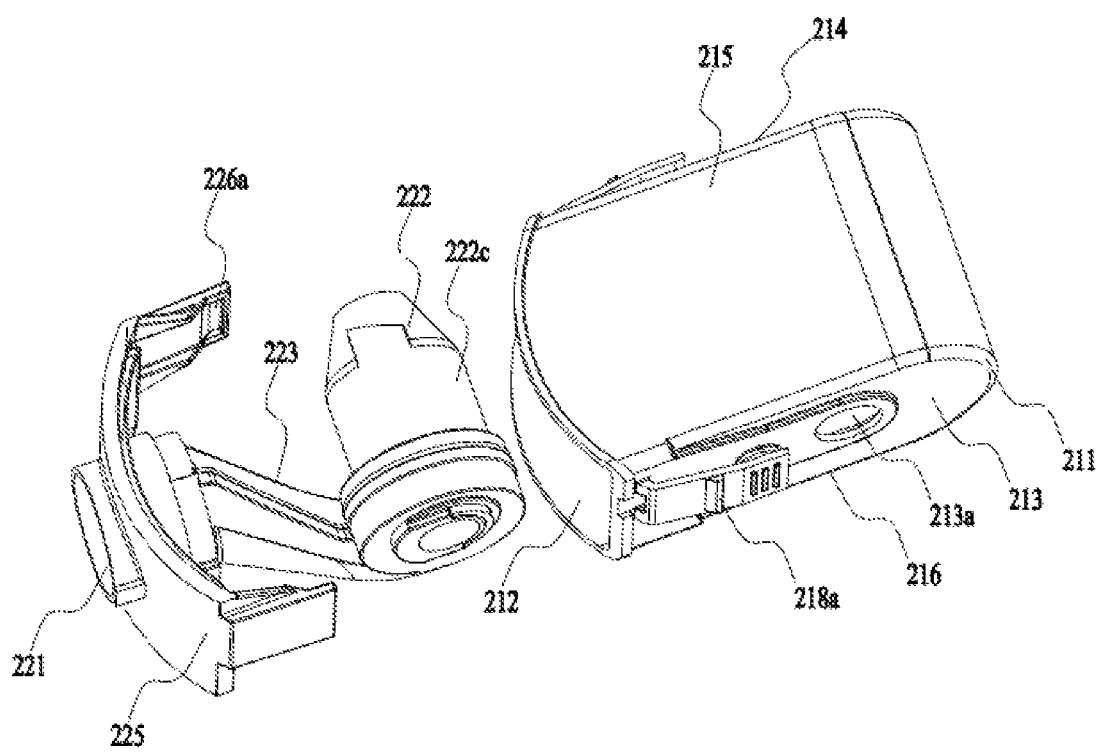
FIG. 6 is a perspective view of the dust collection device of FIG. 4 when a first housing portion is separated from a second housing portion.
Figure 7:
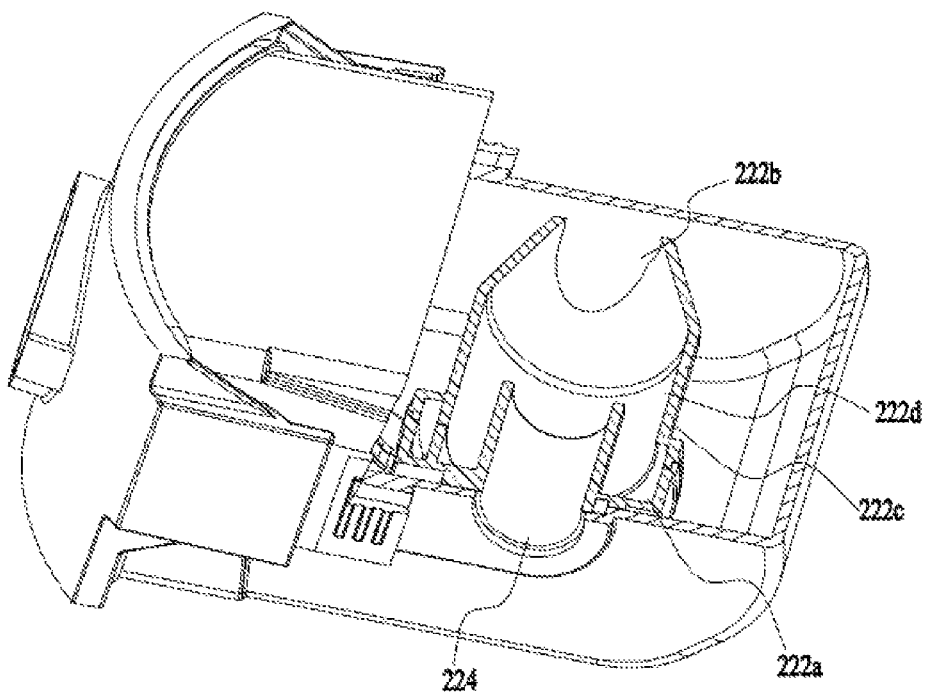
FIG. 7 is a perspective view of the dust collection device of FIG. 4 when a part of a first housing portion is cross sectioned.

As illustrated in FIG. 5 and FIG. 6, an elastic tab 218 is formed at an outer side of the first housing portion 21, and provided with a hook portion 218a. The second housing portion 22 is provided with a coupling portion 226 for cooperating with the elastic tab 218. The coupling portion 226 is provided with a slot 226a for embedding at least part of the hook portion 218a. In this way, when the second housing portion 22 is coupled to the first housing portion 21, the elastic tab 218 may generate an elastic force that is operative to move the hook portion 218a toward the slot 226a and to be embedded into the slot 226a. The elastic force generated by the elastic tab 218 may be generated by the structure of the elastic tab 218, and may be generated by the manner that a spring 219 for biasing the elastic tab 218 is arranged on the first housing portion 21.

Figure 8:
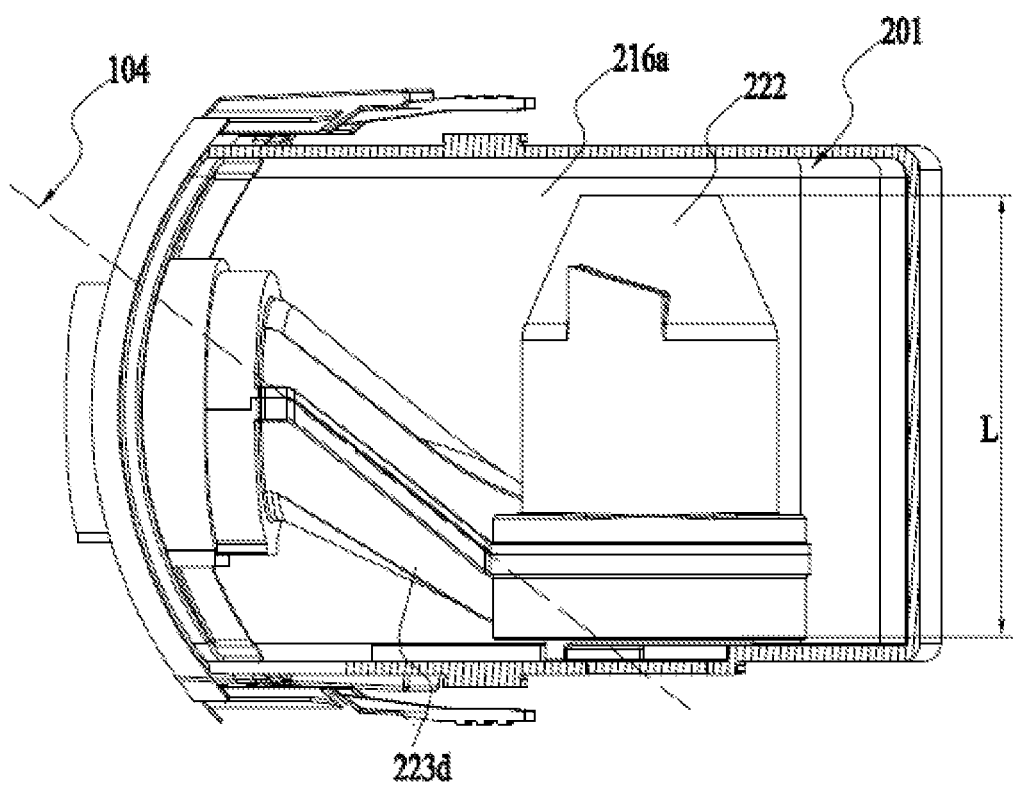
FIG. 8 is a plan view of the dust collection device of FIG. 4 when a first housing portion is cross sectioned.

When the dust collection device 200 is mounted to the tool main body 100, the dust collection device 200 includes a dust heaping plane 216a for heaping the dust. In one example, the dust heaping plane 216a may be formed by the lower wall 216 of the first housing portion 21. As illustrated in FIG. 1 and FIG. 8, when the dust collection device 200 is mounted to the tool main body 100 and the power tool 1 is arranged on a working plane parallel to a horizontal plane, the dust heaping plane 216a obliquely intersects the horizontal plane, so that the dust out of the cyclone pipe 222 is heaped as downward and forward as possible, thus the utilization rate of the accommodating chamber 201 is improved.

In the present example, the tool main body 100 may specifically be a sander. It is known that the sander will generate a relatively large amount of dust during sanding and polishing process, thus it is necessary to connect the dust collection device 200 of the present example to the sander. It should be understood that the tool main body 100 may be other tools requiring dust removal.

Figure 10:
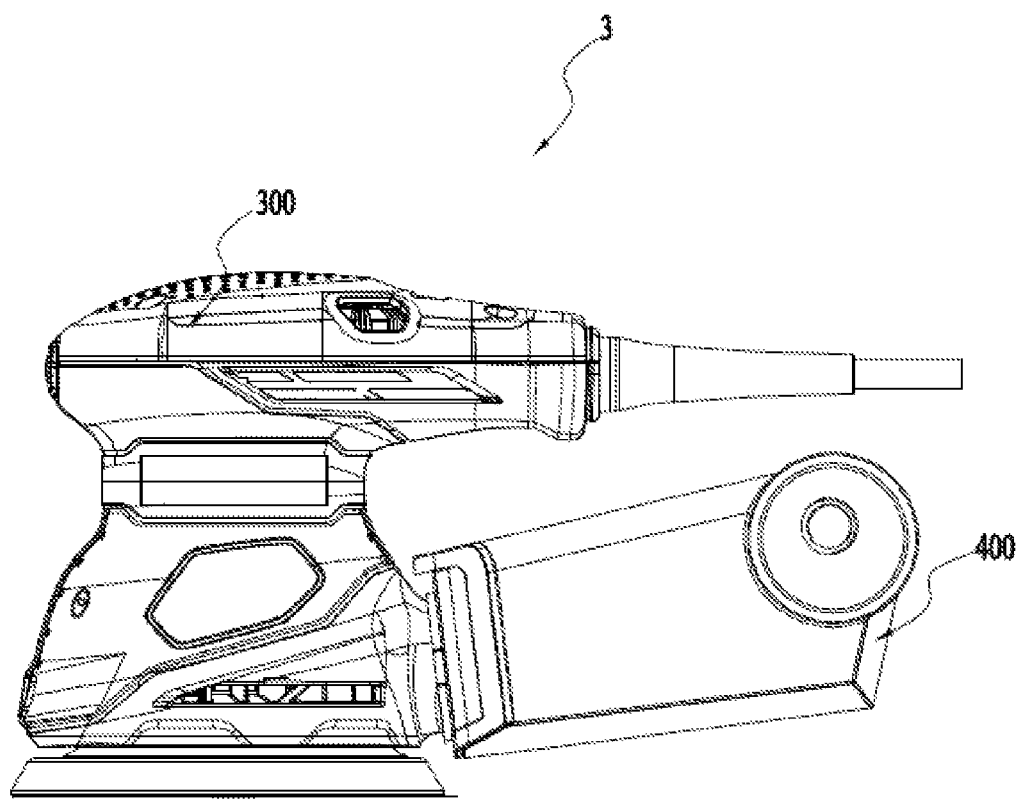
FIG. 10 is a plan view of an example power tool.

The power tool 3 of a second example as illustrated in FIG. 10 has the same tool main body 300 as the power tool 1 of the first example. The dust collection device 400 of the present example further includes a guiding structure for guiding the second housing portion 42 to be joined to the first housing portion 41 along the first straight line 301.

Figure 11:
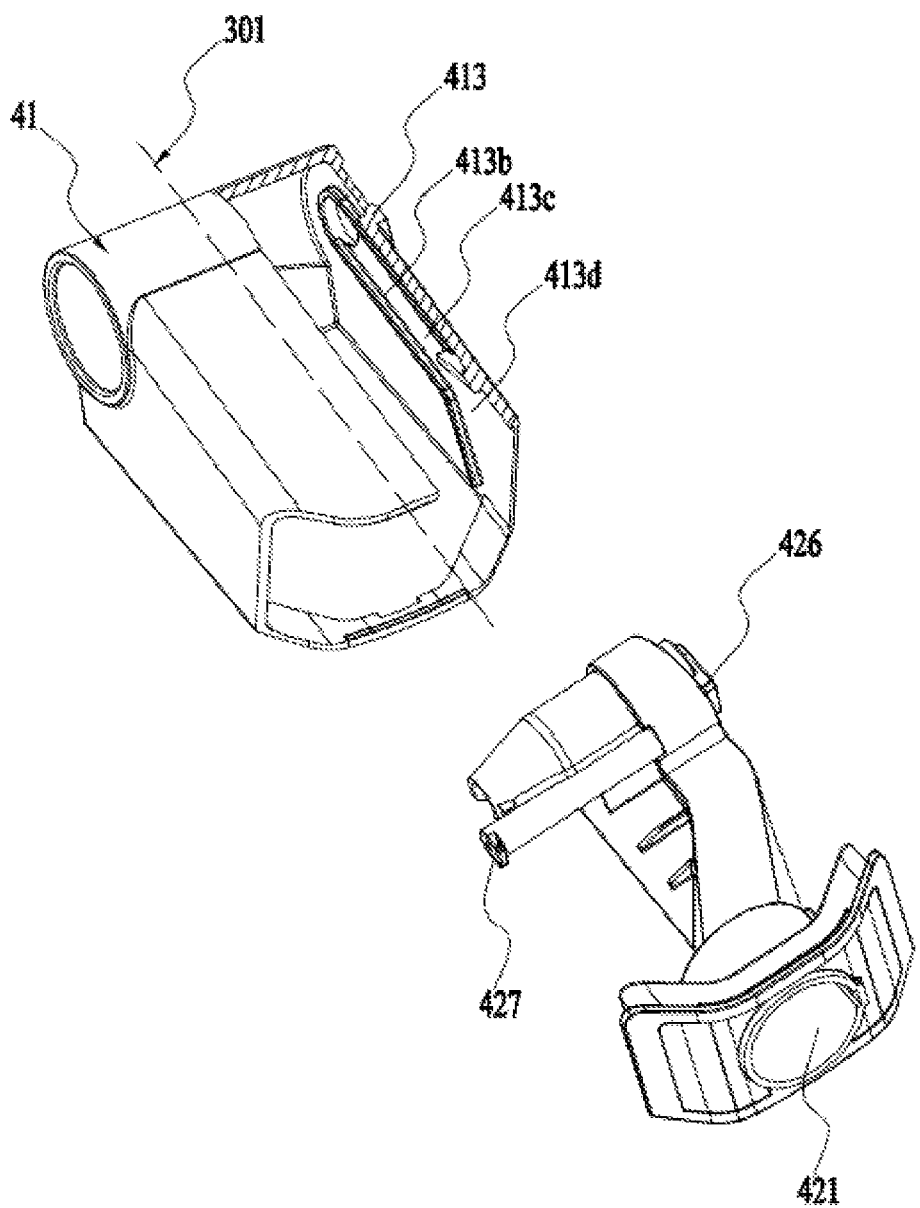
FIG. 11 is a schematic diagram of the dust collection device of FIG. 10 when a left wall is partially cross sectioned.
Figure 12:
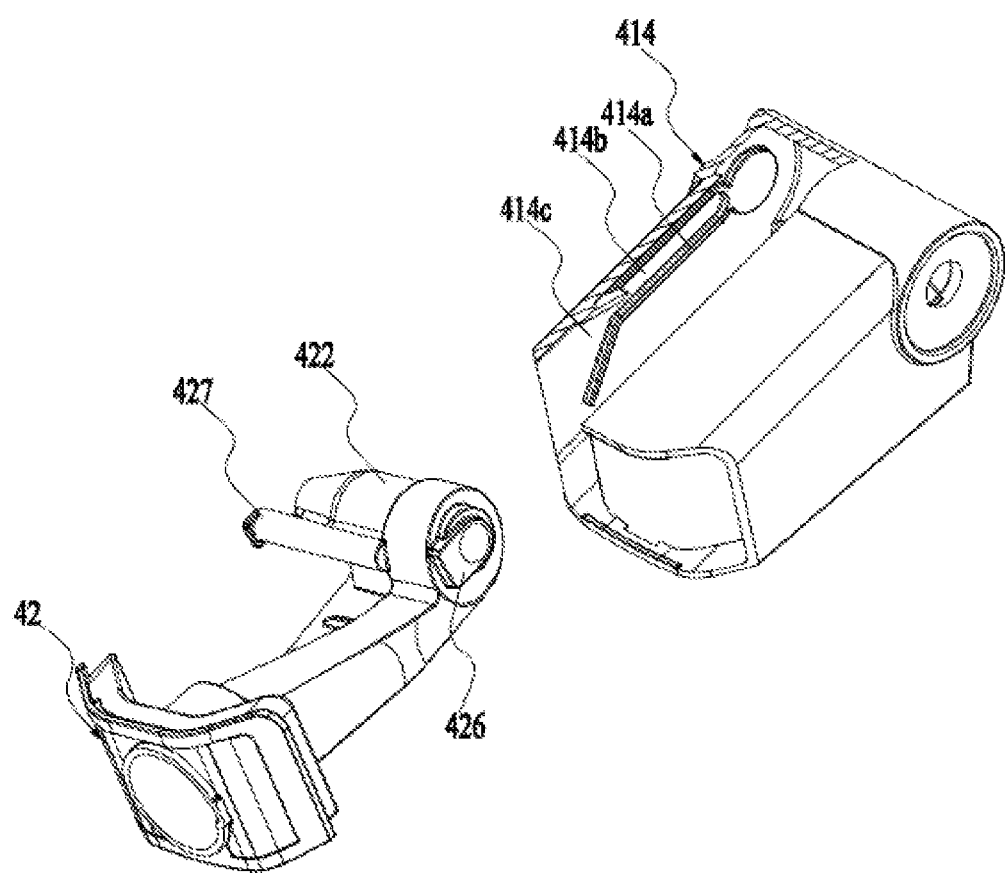
FIG. 12 is a schematic diagram of the dust collection device of FIG. 10 when a right wall is partially cross sectioned.

In one example, as illustrated in FIG. 11 and FIG. 12, the left wall 413 of the first housing portion 41 is further provided with a first guiding rail 413b for guiding the second housing portion 42 to be joined to the first housing portion 41 along the first straight line 301. The right wall 414 is provided with a second guiding rail 414a. The second housing portion 42 or the cyclone pipe 222 fixedly connected to the second housing portion 42 is correspondingly provided with a first matching portion 426 cooperating with the first guiding rail 413b and the second matching portion 427 cooperating with the second guiding rail 414a. In another example, the first guiding rail 413b is provided with a first guiding groove 413c, and the second guiding rail 414a is provided with a second guiding groove 414b, so that a part of the first matching portion 426 may be embedded into the first guiding groove 413c, and a part of the second matching portion 427 may be embedded into the second guiding groove 414b, thus the second housing portion 42 is guided to be joined to the first housing portion 41 along the first straight line 301.

In another example, one end of the first guiding groove 413c facing toward the air inlet pipe 421 is a flared shape 413d, and one end of the second guiding groove 414b facing toward the air inlet pipe 421 is a flared shape 414c, so that a trouble of requiring a tight alignment when the second housing portion 42 is inserted into the first housing portion 41 is avoided, thus the second housing portion 42 can be quickly inserted into the first housing portion 41 by the user.

The foregoing has illustrated and described the basic principles, main features, and advantages of the present disclosure. It is to be understood by those having skill in the art that the foregoing examples are not intended to limit the present disclosure in any form. All technical solutions obtained by means of equivalent substitution or equivalent transformation shall all fall in the scope of protection of the present disclosure.

What is claimed is:

1. A dust collection device, comprising:
a housing comprising a second housing portion relative to a first housing portion in a direction that extends along a first straight line to define an accommodating chamber for collecting a dust, the second housing portion comprising:
an air inlet pipe configured to guide an airflow to enter the dust collection device along the first straight line;
a cyclone pipe extending along a second straight line and comprising a first end for air intake and a second end for dust discharge along the second straight line;
an air duct pipe defining an air duct communicating the air inlet pipe with the cyclone pipe, wherein the air duct pipe extends from a midpoint of the housing towards a sidewall of the housing, in a direction non parallel to the first straight line; and
a ventilation pipe arranged at the first end of the cyclone pipe and in communication with the cyclone pipe;
wherein the ventilation pipe is configured to guide the airflow, after the airflow is subjected to dust separation performed by the cyclone pipe, out of the housing, the housing defines an air outlet, the air outlet is in communication with the ventilation pipe or is used to allow the ventilation pipe to extend out of the housing, and the second straight line along which the cyclone pipe extends intersect the first straight line to form an angle greater than or equal to 25° and less than or equal to 90°.

2. The dust collection device according to claim 1, wherein the second straight line along which the cyclone pipe extends and the first straight line are perpendicular to each other.

3. The dust collection device according to claim 1, further comprising an air guiding portion configured to guide the airflow from the air duct to enter the cyclone pipe substantially along a direction perpendicular to the second straight line.

4. The dust collection device according to claim 1, wherein the air inlet pipe, the cyclone pipe, the air duct pipe, and the ventilation pipe are fixedly connected to the second housing portion.

5. The dust collection device according to claim 1, wherein the air duct pipe at least partially extends along a direction obliquely intersecting the second straight line.

6. The dust collection device according to claim 1, wherein the air duct pipe comprises a third end connected to the air inlet pipe and a fourth end connected to the cyclone pipe, the third end and the fourth end are located at two ends along an extending direction of the air duct pipe, and the fourth end and the third end of the air duct pipe constitute a height difference along the second straight line.

7. The dust collection device according to claim 1, wherein the housing defines a length direction extending along the first straight line and the second straight line along which the cyclone pipe extends in the accommodating chamber is perpendicular to the length direction of the housing.

8. The dust collection device according to claim 1, wherein the cyclone pipe further comprises an intermediate section arranged between the first end and the second end along the second straight line, the intermediate section has an inner wall which has a circular cross section in a plane perpendicular to the second straight line, and a ratio of a diameter of the circular shape formed by the cross section of the inner wall of the intermediate section in the plane perpendicular to the second straight line to a length of cyclone pipe along the second straight line is greater than or equal to 0.4 and less than or equal to 0.7.

9. The dust collection device according to claim 8, wherein the cyclone pipe comprises at least one pipe element.

10. The dust collection device according to claim 8, wherein the air inlet pipe is located between the first end and the second end along a direction parallel to the second straight line.

11. The dust collection device according to claim 1, wherein the accommodating chamber is opened to form a dust pouring opening for pouring out the dust in the accommodating chamber in response to detaching the second housing portion and the first housing portion from each other.

12. The dust collection device according to claim 11, wherein the air inlet pipe, the cyclone pipe, the air duct pipe, and the ventilation pipe are fixedly connected to the second housing portion so that the air inlet pipe, the cyclone pipe, the air duct pipe, and the ventilation pipe are separated from the accommodating chamber in response to the second housing portion being detached from the first housing portion.

13. The dust collection device according to claim 11, wherein the dust pouring opening is opened towards a direction in which the second housing portion is detached from the first housing portion.

14. The dust collection device according to claim 1, wherein the first housing portion is provided with a guiding rail for guiding the second housing portion to be joined to the first housing portion along the first straight line and the second housing portion is provided with a matching portion for cooperating with the guiding rail.

15. The dust collection device according to claim 1, wherein the housing has a length extending along the first straight line, the housing comprises a front wall and a rear wall at two ends in the length of the housing, the rear wall is formed by the first housing portion, and the front wall is formed by the second housing portion.

16. The dust collection device according to claim 1, wherein the air inlet pipe is configured to place an inside and an outside of the housing into communication and the air inlet pipe is fixedly connected to the second housing portion and penetrates through the second housing portion in the first straight line.

17. The dust collection device according to claim 1, wherein the second straight line along which the cyclone pipe extends and the first straight line are perpendicular to each other, the housing has a length extending along the first straight line and a width extending along the second straight line, and a size of the housing in the length is greater than a size of the housing in the width.

18. A power tool, comprising:
a tool housing;
a motor arranged inside the tool housing; and
a dust collecting device detachably connected to the housing;
wherein the dust collection device comprises: a housing comprising a second housing portion moveable relative to a first housing portion in a direction that extends along a first straight line to define an accommodating chamber for collecting a dust, the second housing portion comprising:
an air inlet pipe configured to guide an airflow to enter the dust collection device along the first straight line;
a cyclone pipe extending along a second straight line comprising a first end for the air intake and a second end for dust discharge along the second straight line;
an air duct pipe defining an air duct communicating the air inlet pipe with the cyclone pipe, wherein the air duct pipe extends from a midpoint of the housing towards a sidewall of the housing, in a direction non parallel to the first straight line; and
a ventilation pipe arranged at the first end of the cyclone pipe and communicated with the cyclone pipe;
wherein the ventilation pipe is configured to guide the airflow after the airflow is subjected to dust separation performed by the cyclone pipe out of the housing, the housing defines an air outlet, the air outlet is in communication with the ventilation pipe or the ventilation pipe extends out of the housing through the air outlet, and the second straight line along which the cyclone pipe extends intersect the first straight line to form an angle greater than or equal to 25° and less than or equal to 90°.

19. The power tool according to claim 18, wherein the housing comprises a dust heaping plane for heaping the dust, the dust collection device is mounted onto the tool housing, and, when the power tool is arranged on a working plane parallel to a horizontal plane, the dust heaping plane obliquely intersects the horizontal plane.

\* \* \* \* \*